US011285385B2

(12) United States Patent
Hakuta

(10) Patent No.: US 11,285,385 B2
(45) Date of Patent: Mar. 29, 2022

(54) NON-TRANSITORY COMPUTER-READABLE RECORDING MEDIUM, INFORMATION PROCESSING DEVICE, AND METHOD OF CONTROLLING INFORMATION PROCESSING DEVICE

(71) Applicant: GREE, INC., Tokyo (JP)

(72) Inventor: Koji Hakuta, Tokyo (JP)

(73) Assignee: GREE, INC., Tokyo (JP)

( * ) Notice: Subject to any disclaimer, the term of this patent is extended or adjusted under 35 U.S.C. 154(b) by 42 days.

(21) Appl. No.: 16/594,650

(22) Filed: Oct. 7, 2019

(65) Prior Publication Data

US 2020/0030695 A1 Jan. 30, 2020

Related U.S. Application Data

(63) Continuation of application No. 16/142,569, filed on Sep. 26, 2018, now Pat. No. 10,471,349, which is a
(Continued)

(30) Foreign Application Priority Data

Aug. 21, 2014 (JP) .................................. 2014-168144

(51) Int. Cl.
*A63F 13/35* (2014.01)
*A63F 13/69* (2014.01)
*A63F 13/80* (2014.01)

(52) U.S. Cl.
CPC .............. *A63F 13/35* (2014.09); *A63F 13/69* (2014.09); *A63F 13/80* (2014.09)

(58) Field of Classification Search
CPC ........... A63F 13/80; A63F 13/69; A63F 13/35
See application file for complete search history.

(56) References Cited

U.S. PATENT DOCUMENTS 7,636,783 B2   12/2009   Heutchy
8,920,243 B1   12/2014   Curtis
(Continued)

FOREIGN PATENT DOCUMENTS

JP    6-186059 A     7/1994
JP    2002-526824 A  8/2002
(Continued)

OTHER PUBLICATIONS

Japanese Office Action dated Oct. 21, 2014 in Patent Application No. 2014-168144 with English translation.
(Continued)

*Primary Examiner* — Reginald A Renwick
(74) *Attorney, Agent, or Firm* — Oblon, McClelland, Maier & Neustadt, L.L.P.

(57) ABSTRACT

A system (information processing device) is caused to determine at least one game medium from among a plurality of game media to be provided to a communication terminal, cause the communication terminal to display the at least one game medium, provide the communication terminal with a game environment to test the at least one game medium; and store the at least one game medium in association with an identifier of the communication terminal upon receiving a notification from the communication terminal indicating that the at least one game medium has been selected for possession.

18 Claims, 8 Drawing Sheets

Related U.S. Application Data continuation of application No. 14/827,961, filed on Aug. 17, 2015, now Pat. No. 10,099,127.

(56) References Cited

U.S. PATENT DOCUMENTS

| | | | |
|---|---|---|---|
| 9,374,616 B2 | 6/2016 | Farrugia | |
| 2006/0205462 A1* | 9/2006 | Bentz | G06Q 30/02 463/2 |
| 2009/0051114 A1 | 2/2009 | Robbers | |
| 2010/0075745 A1* | 3/2010 | Gomez | G07F 17/32 463/25 |
| 2011/0263306 A1* | 10/2011 | Nakamura | A63F 13/75 463/4 |
| 2014/0121026 A1* | 5/2014 | Hashimoto | A63F 13/69 463/42 |

FOREIGN PATENT DOCUMENTS

| | | |
|---|---|---|
| JP | 2002346235 A | 12/2002 |
| JP | 2003-030365 | 1/2003 |
| JP | 2004-174090 A | 6/2004 |
| JP | 2008-12221 A | 1/2008 |
| JP | 2013-233373 A | 11/2013 |
| JP | 2014-12051 A | 1/2014 |
| JP | 5409876 B1 | 2/2014 |
| JP | 2014-061401 A | 4/2014 |
| JP | 5478760 B1 | 4/2014 |
| JP | 6280093 B2 | 2/2018 |

OTHER PUBLICATIONS

Japanese Office Action dated Jul. 14, 2015 in Patent Application No. 2015-088146 with English translation.
Japanese Office Action dated Jun. 8, 2020 in Patent Application No. 2019-111530 (with English translation), 12 pages.
Japanese Office Action dated Mar. 11, 2020 in Patent Application No. 2018-167254 (with English translation), 9 pages.
Japanese Office Action dated May 12, 2020 in Patent Application No. 2019-072333 (with English translation), 6 pages.
Japanese Office Action dated Apr. 3, 2020 in Patent Application No. 2019-036527 (with English translation), 6 pages.
Japanese Office Action dated May 26, 2020 in Patent Application No. 2015-181882 (with English translation), 6 pages.
Japanese Office Action dated Aug. 24, 2021 in Patent Application No. 2020-151821, with computer generated English translation.

* cited by examiner

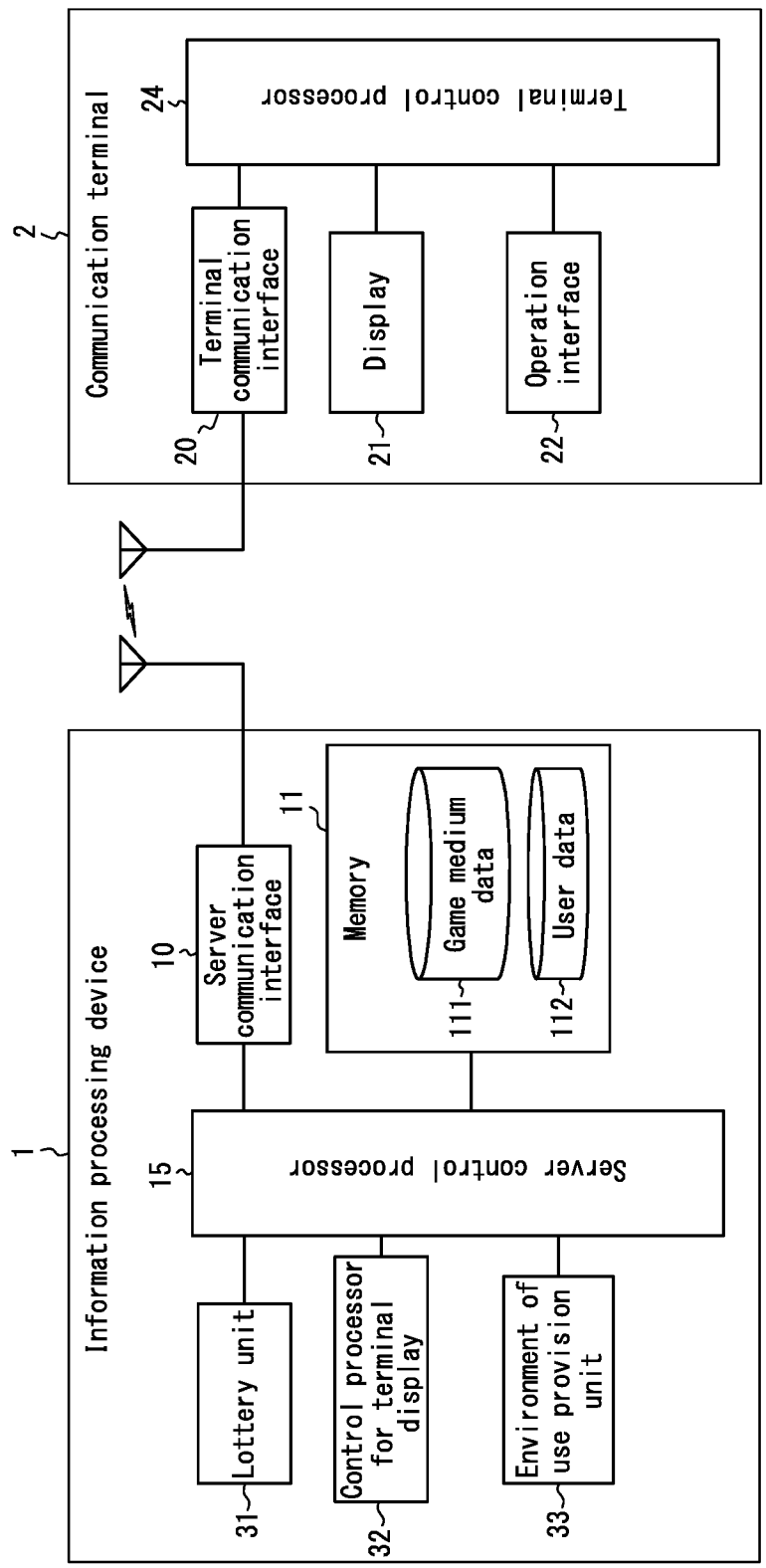

FIG. 2

| Game medium identifier | Game medium name | Game medium image | Category | Ability | Rarity | ... |
|---|---|---|---|---|---|---|
| ITM001 | Game medium A | Game medium A image | Character | a2, b3, d1 | 5 | ... |
| ITM002 | Game medium B | Game medium B image | Character | f6, h6 | 4 | ... |
| ITM003 | Game medium C | Game medium C image | Weapon | a7 | 1 | ... |
| ITM004 | Game medium D | Game medium D image | Weapon | g3 | 2 | ... |
| ITM005 | Game medium E | Game medium E image | Armor | a4 | 1 | ... |
| ITM006 | Game medium F | Game medium F image | Armor | e2 | 3 | ... |
| ITM007 | Game medium G | Game medium G image | Item | b8 | 3 | ... |
| ITM008 | Game medium H | Game medium H image | Item | c9 | 2 | ... |
| ... | ... | ... | ... | ... | ... | ... |

| User identifier | Game medium selected by lottery | Time elapsed since issuance | Remaining lottery time | Purchased game media | Number of demo battles | |
|---|---|---|---|---|---|---|
| UID001 | Game medium A | 2 h 30 m | 52 h 20 m | A | 1 | ... |
| UID002 | Game medium B | 14 h 00 m | 160 h 50 m | C, E | 3 | ... |
| UID003 | Game medium A | 0 h 50 m | 3 h 00 m | A, B, E | 0 | ... |
| UID004 | Game medium E | 35 h 40 m | 48 h 30 m | B | 2 | ... |
| UID005 | — | — | 190 h 10 m | — | — | ... |
| ... | ... | ... | ... | ... | ... | ... |

112

Purchase confirmation screen

Demo battle screen

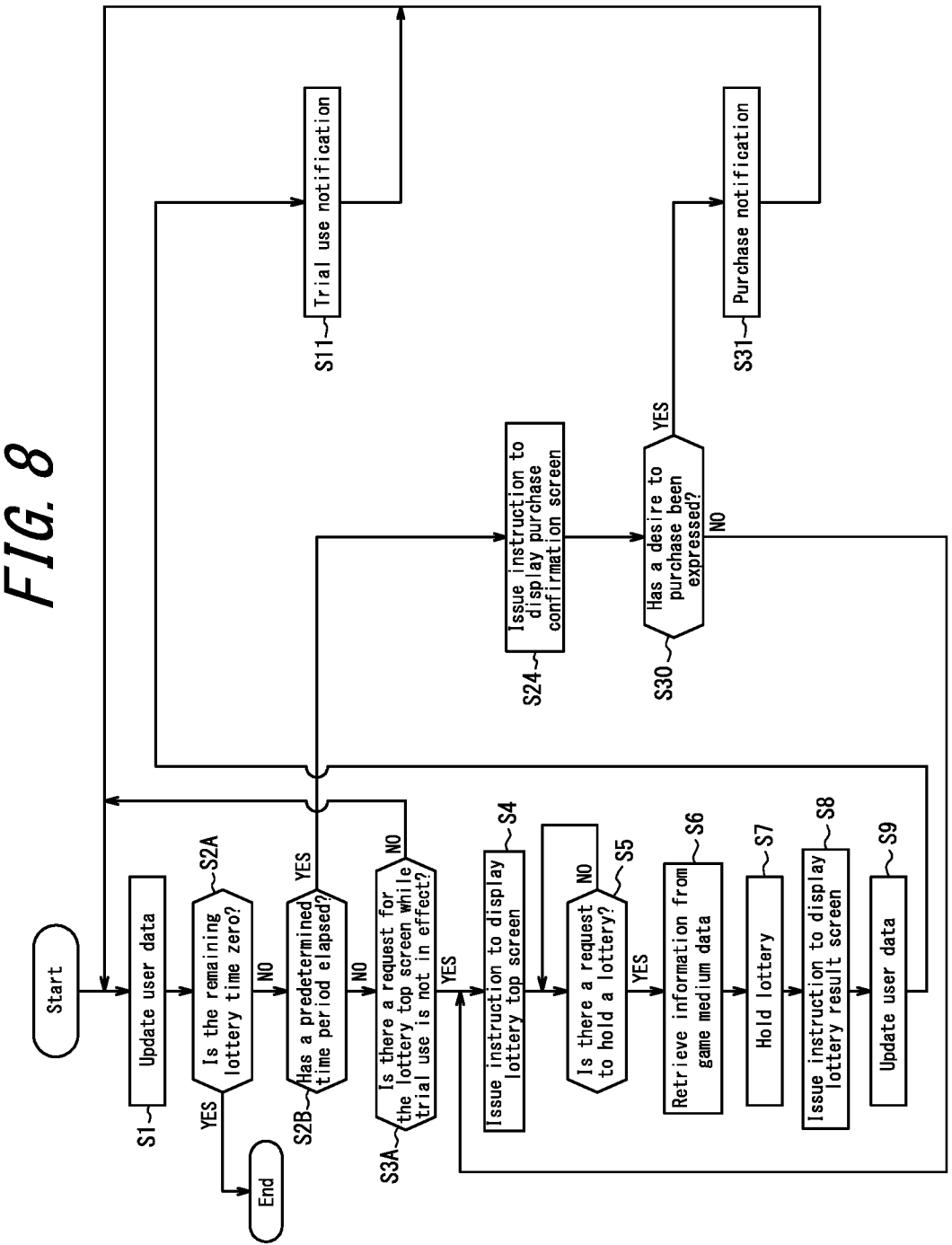

NON-TRANSITORY COMPUTER-READABLE RECORDING MEDIUM, INFORMATION PROCESSING DEVICE, AND METHOD OF CONTROLLING INFORMATION PROCESSING DEVICE

CROSS-REFERENCE TO RELATED APPLICATION

This application is a continuation of U.S. application Ser. No. 16/142,569, filed Sep. 26, 2018, which is a continuation of U.S. application Ser. No. 14/827,961, filed Aug. 17, 2015 (Now U.S. Pat. No. 10,099,127), and is based upon and claims priority to and the benefit of Japanese Patent Application No. 2014-168144 filed Aug. 21, 2014, the entire contents of each of which are incorporated herein by reference.

TECHNICAL FIELD

This disclosure relates to a non-transitory computer-readable recording medium, an information processing device, and a method of controlling an information processing device.

BACKGROUND

Some video games that use an information processing device, such as a computer, hold a lottery that has a predetermined chance of winning. For example, in the card battle game disclosed in JP 2014-61401 A (PTL 1), a special battle (support battle) in accordance with the lottery results is held, and the enemy's hit points can be reduced by a predetermined amount. Progress is made in the game through such a support battle held in accordance with the lottery results, thereby preventing a reduction in the user's motivation to continue the game.

CITATION LIST

Patent Literature

PTL 1: JP 2014-61401 A

SUMMARY

A lottery is not only used to determine whether to hold a special event during the game. For example, a game medium (such as a card, character, weapon, armor, item, or the like within the game) may be selected by lottery, and by indicating a desire to possess the game medium (for example, by paying a price), the user can possess the selected game medium. By possessing such a game medium, the user can gain an advantage in the game.

In general, however, users have to decide whether they desire to possess the game medium that was selected as a result of the lottery (game medium selected by lottery) without sufficiently understanding the effect, function, and strength of the game medium. Therefore, if the user feels that the desired effect is not obtained after indicating a desire to possess the game medium selected by lottery, the user might feel less satisfied with the game.

In light of this background, it could be helpful to provide a non-transitory computer-readable recording medium, information processing device, and method of controlling an information processing device that can suppress a reduction in user satisfaction with a game due to possessing a game medium.

A non-transitory computer-readable recording medium includes computer program instructions, which when executed by a computer that provides a game to a communication terminal, cause the computer to:

determine at least one game medium from among a plurality of game media to be a game medium to provide to a user of the communication terminal;

cause the communication terminal to display the at least one game medium determined to be the game medium to provide to the user;

provide the communication terminal with a game medium environment of use for the user to test use of the at least one game medium before accepting, from the communication terminal, operation input selecting whether to possess the at least one game medium; and store the at least one game medium in association with a user identifier of the communication terminal upon accepting, from the communication terminal, operation input selecting to possess the at least one game medium.

The game medium environment of use may be a different event than the game. Furthermore, the event may be a battle with an opponent, and in the event, the user may be able to use at least one of a function and an ability that the at least one game medium has.

The event may be held automatically.

The computer program instructions may further cause the computer to:

accept operation input to hold the event, or operation input selecting whether to possess the at least one game medium, after the event is held.

The game medium environment of use may be the game during a predetermined time period.

The computer program instructions may further cause the computer to:

add an attribute to the at least one game medium upon accepting, from the communication terminal, operation input selecting to possess the at least one game medium during the predetermined time period, the attribute differing in accordance with timing at which the operation input is accepted.

An information processing device for providing a game to a communication terminal comprises:

circuitry configured to:

determine at least one game medium from among a plurality of game media to be a game medium to provide to a user of the communication terminal;

cause the communication terminal to display the at least one game medium determined to be the game medium to provide to the user;

provide the communication terminal with a game medium environment of use for the user to test use of the at least one game medium before accepting, from the communication terminal, operation input selecting whether to possess the at least one game medium; and store the at least one game medium in association with a user identifier of the communication terminal upon accepting, from the communication terminal, operation input selecting to possess the at least one game medium.

A method of controlling an information processing device for providing a game to a communication terminal comprises:

determining at least one game medium from among a plurality of game media to be a game medium to provide to a user of the communication terminal;

causing the communication terminal to display the at least one game medium determined to be the game medium to provide to the user;

providing the communication terminal with a game medium environment of use for the user to test use of the at least one game medium before accepting, from the communication terminal, operation input selecting whether to possess the at least one game medium; and storing the at least one game medium in association with a user identifier of the communication terminal upon accepting, from the communication terminal, operation input selecting to possess the at least one game medium.

The disclosed non-transitory computer-readable recording medium, information processing device, and method of controlling an information processing device can suppress a reduction in user satisfaction with a game due to possessing a game medium.

BRIEF DESCRIPTION OF THE DRAWINGS

In the accompanying drawings:

FIG. 1 is a block diagram of a game system that includes an information processing device according to Embodiment 1;

FIG. 2 illustrates an example of game medium data;

FIG. 3 illustrates an example of user data;

FIG. 8 is a flowchart illustrating a method of controlling an information processing device according to Embodiment 3.

DETAILED DESCRIPTION

Figure 4A:
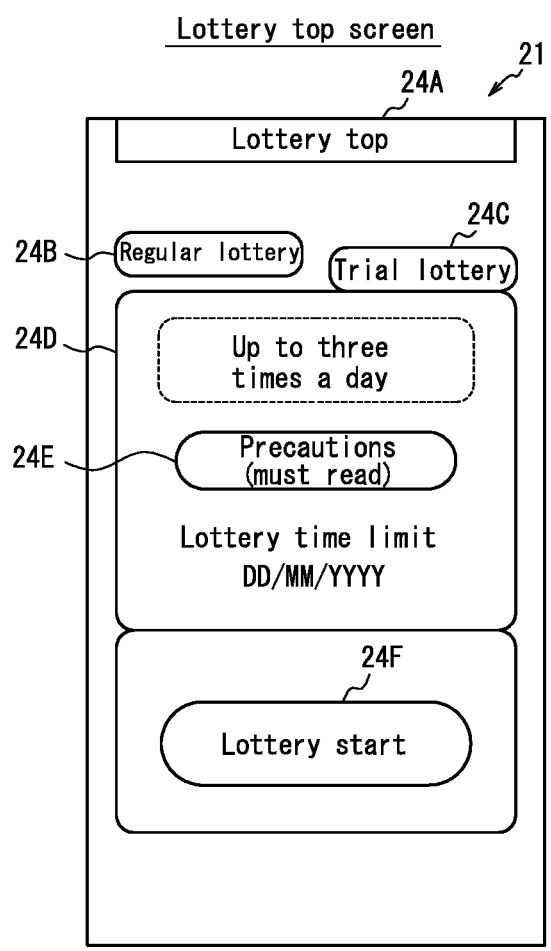
FIG. 4(a) illustrates an example of a lottery top screen.

The following describes the disclosed embodiments with reference to the drawings.

Embodiment 1

FIG. 1 is a block diagram of a game system that includes an information processing device 1 according to Embodiment 1. This game system includes the information processing device 1 and a communication terminal 2. While only one communication terminal 2 is illustrated in FIG. 1 for the sake of convenience, a plurality of communication terminals 2 may be provided. The information processing device 1 and the communication terminal 2 communicate over a network, such as the Internet, yet may communicate directly. The function of the information processing device 1 could be implemented over a plurality of information processing devices 1.

In this embodiment, the information processing device 1 is a game server that delivers a game to the communication terminal 2. The game delivered by the information processing device 1 is a battle game in this embodiment.

The communication terminal 2 is a terminal device with which the user performs operations related to the game and to a lottery. In this embodiment, the communication terminal 2 is a smartphone. In the battle game delivered by the information processing device 1, the user gathers cards to form a deck, selects cards from the deck, and fights an opponent (referred to below as a battle) or takes on tasks (quests, missions, or the like). The name and image of a game medium that may be used in a battle or task are depicted on a card, and a special ability is established for each game medium. The term "game medium" is a general term for electronic data that may be acquired, possessed, used, managed, exchanged, combined, strengthened, sold, discarded, and/or gifted in the game by a player in accordance with game progress. The game medium may, for example, be a card, character, avatar, weapon, armor, item, or the like within the game. In this disclosure, the game medium is mainly described as being a character, yet the forms of use of the game medium are not limited to those explicitly included in this disclosure. The game medium includes a variety of parameter information, examples of which include combat points such as attack points and defense points of the game medium, combat means such as attack means and defense means of the game medium, ability and skill information of the game medium, information on the avatar of the game medium, properties of the game medium, an index indicating the below-described rarity of the game medium, and the like.

(Overall System Configuration)

The information processing device 1 includes a server communication interface 10, a memory 11, a server control processor 15. The memory 11 stores a lottery module 31, a control processor 32 for terminal display, and a game medium environment of use provision module 33 (referred to below simply as the "environment of use provision module 33"). The lottery module 31, the control processor 32, and the environment of use provision module 33 may be software modules that are implemented by the server control processor 15.

The server communication interface 10 communicates with the communication terminal 2. While the server communication interface 10 communicates with the communication terminal 2 by a wireless connection in this embodiment, communication may be by a wired connection instead. The server communication interface 10 may also be enabled to choose between wireless communication and wired communication or to use both.

The memory 11 stores game medium data 111 and user data 112. In this embodiment, these data are stored in the memory 11 in table form. Details are provided below.

The server control processor 15 controls various operations of the information processing device 1 and overall game progress. The server control processor 15 for example determines the opponent in a battle, the content of the tasks the user takes on, or the like, and transmits instructions to display a variety of game screens to the communication terminal 2 via the server communication interface 10. To conduct the game appropriately, the server control processor 15 controls the lottery module 31, control processor 32 for terminal display, and environment of use provision module 33 by implementing them as software modules and causes the environment of use provision module 33 to manage the user data 112 (for example, to update values).

When there is a request to hold a lottery from the user, the lottery module 31 selects a game medium from among a plurality of game media by lottery. The plurality of game media may be of different types. While the lottery module 31 selects one game medium at a time in this embodiment, a plurality of game media may be selected instead. The user possesses the game medium selected by the lottery module 31 as the game medium to provide to the user (game medium selected by lottery) by performing operation input to select possession. In other words, in order for the user to possess the game medium selected by lottery, it is necessary not only for the game medium to be selected by lottery, but also for the user to select possession. A selection operation to select purchasing is an example of operation input to select possession. Purchasing refers to paying in-game currency, points, tickets, or the like as the price for acquiring the game medium selected by lottery. While the case of the user possessing a game medium by purchasing is described as an example below, the user may possess the game medium by freely acquiring instead of purchasing the game medium. Each time there is a request to hold a lottery from the user, the lottery module 31 may randomly select at least one game medium to provide to the user from among a plurality of game media. As another lottery method, the order of issuance (selection) may be set in advance, and when there is a request to hold a lottery from the user, the lottery module 31 may issue an item in accordance with the set order. The game medium selected by lottery corresponds to the "at least one game medium" of this disclosure.

In this embodiment, the lottery module 31 holds a lottery in accordance with probabilities that correspond to the rarity of game media. The rarity (unusualness, i.e. value within the game) of a game medium is, for example, represented as a numerical value. As the rarity is higher (as the numerical value is larger), the game medium is more rare. For example, the lottery module 31 may select a game medium having a rarity of one with a probability of 10% and select a game medium having a rarity of five with a probability of 0.01%. In this case, the user attempts to obtain a game medium with high rarity, thus leading to continued requests to hold a lottery and preventing a reduction in the user's motivation to continue the game. The lottery module 31 can retrieve information on rarity from the game medium data 111 stored in the memory 11. To allow the user to easily grasp the value within the game, the rarity may, for example, be differentiated into orders (levels) such as normal, rare, super-rare, ultra-rare, and the like.

As another embodiment, the lottery module 31 may hold the lottery so that the same game medium selected by lottery is not selected again. The lottery module 31 can avoid duplicate selection of the game medium selected by lottery by, for example, providing a group (set) of game media that can be selected by lottery and removing each game medium selected by lottery from the group of game media. In this case, the number of game media selectable by lottery decreases as lotteries are held. Therefore, when a game medium that the user wants is still among the game media selectable by lottery, the chance of winning that game medium increases. This facilitates the continuation of requests from the user to hold a lottery and leads to further prevention of a reduction in the user's motivation to continue the game.

Via the server control processor 15 and the server communication interface 10, the control processor 32 for terminal display causes the communication terminal 2 to display screens related to the lottery held by the lottery module 31. As described below, the control processor 32 for terminal display for example causes the communication terminal 2 to display a lottery top screen, a lottery result screen, a purchase confirmation screen, a demo battle screen, and the like. Via control by the server control processor 15, the control processor 32 for terminal display may also cause the communication terminal 2 to display screens not related to the lottery.

The environment of use provision module 33 provides an environment in which the user can use the game medium selected by lottery (game medium environment of use) and manages the user data 112 stored in the memory 11. In this embodiment, the game medium environment of use is provided as an event (the below-described demo battle). In another embodiment, the game medium environment of use may be the battle game itself for which a predetermined time period (trial period) is established. At this time, the environment of use provision module 33 also sets the opponent that the user battles and the conditions (such as the opponent's level, whether the battle is an individual battle or a group battle, and the like). By the environment of use provision module 33 providing a game medium environment of use, the user can sufficiently understand the effect, function, and strength of the game medium in the game. In this embodiment, users can know the effect, function, and strength of the game medium selected by lottery, including the below-described ability, before they decide whether they desire to possess the game medium.

All or a portion of the lottery module 31, control processor 32 for terminal display, and environment of use provision module 33 may be combined into one block in the program. Conversely, all or a portion of the lottery module 31, control processor 32 for terminal display, and environment of use provision module 33 may be further divided into separate blocks. The information processing device 1 may be a computer that operates in accordance with a program stored in the memory 11, and all or a portion of the lottery module 31, control processor 32 for terminal display, and environment of use provision module 33 may be implemented by software. For example, the program stored in the memory 11 may cause the computer to function as the lottery module 31, control processor 32 for terminal display, and environment of use provision module 33.

The communication terminal 2 is provided with a terminal communication interface 20, a display 21, an operation interface 22, and a terminal control processor 24.

The terminal communication interface 20 communicates with the information processing device 1. While the terminal communication interface 20 communicates with the information processing device 1 by a wireless connection in this embodiment, communication may be by a wired connection instead. The terminal communication interface 20 may also be enabled to choose between wireless communication and wired communication or to use both.

In accordance with instructions from the information processing device 1, the display 21 displays screens of the game, screens of an event (for example, a demo battle), and screens related to the lottery held by the lottery module 31.

The operation interface 22 accepts user operation performed in relation to the game, event, or lottery. The operation interface 22 transmits an input signal in accordance with the accepted user operation to the terminal control processor 24. The operation interface 22 may use any type of input interface, such as buttons, a touch panel, or the like. The operation interface 22 is described below as being a touch panel.

The terminal control processor 24 controls various operations of the communication terminal 2. The terminal control processor 24 also retrieves, from the operation interface 22, an input signal in accordance with user operation accepted on various screens displayed on the display 21. Via the terminal communication interface 20, the terminal control processor 24 transmits the acquired input signal to the information processing device 1.

(Game Medium Data)

FIG. 2 illustrates an example of game medium data 111 stored in the memory 11. In the game medium data 111, the "game medium name" (for example, game medium A) has attached thereto a uniquely identifiable identifier ("game medium identifier", such as ITM001) to distinguish the game medium. In association with the game medium identifier, the parameters "game medium image", "category", "ability", and "rarity" are managed in table form. The parameters are not limited to those listed in FIG. 2. For example, information such as "popularity", which is determined based on the probability of purchase, may be further included. Conversely, a portion of the parameters may be omitted. The game medium data 111 may be unchanging or may be updated by the server control processor 15, for example when game media increase or decrease.

While the "game medium identifier" is a combination of the letters "ITM" and a three-digit number in this embodiment, this example is not limiting. The "game medium name" is the name of the game medium. As long as the game medium can be distinguished by the game medium identifier, duplicate game medium names are allowed. The "game medium image" is an image of the game medium in the game. The degree of decoration of the game medium image changes in accordance with the rarity. For example, the decoration of the character included in the image and of the character's background image becomes more elaborate as the rarity is higher.

The "category" indicates the category of the game medium. In this embodiment, categories include a "character" that battles together as an ally; a "weapon" that an allied character uses to attack; "armor" that protects an allied character from an opponent's attack; an "item" such as an ornament, food, or the like; and a "card" for forming the deck. The categories are not, however, limited to these examples.

As described above, the "ability" is a special ability that the game medium has. In this embodiment, the ability is subdivided into, for example, a command ability that allows for an advantage in battle, a passive ability that has the effect of raising the adequacy of armor or the status of an allied character, a dungeon ability that allows for an advantage in a dungeon siege, and the like. The game medium may have one or more abilities or may have no ability. The ability may also be acquired in levels. In this embodiment, subdivided abilities are indicated by the letters a to h, and the acquirable level is indicated by a numerical suffix.

As described above, the rarity is a representation of the rarity (unusualness) of the game medium as a numerical value. As the rarity is higher (as the numerical value is larger), the game medium is more rare. In this embodiment, the rarity of each game medium is ranked from 1 to 5. The lottery module 31 retrieves information on rarity in the game medium data 111 and holds a lottery so that as the rarity of a game medium is higher, the probability of choosing that game medium decreases.

The parameters of the game medium data 111 are now described assuming that, for example, the game medium A in FIG. 2 is "Knight" (see FIG. 4(*b*)). An image of "Knight" (see FIG. 4(*b*)) is stored in the memory 11 as the game medium A image. The category of "Knight" is a "character" that battles together as an ally. "Knight" has abilities "a2", "b3", and "d1" (see FIG. 5(*b*)) and a rarity of "5". In greater detail, the ability "d" can be acquired from the start (level 1), whereas ability "a" can be acquired from level 2, and ability "b" from level 3. Not providing all of the abilities from the start, but rather establishing levels at which each ability can be acquired, can motivate the user to continue the game.

(User Data)

FIG. 3 illustrates an example of user data 112 stored in the memory 11. The user data 112 distinguishes the user of the communication terminal 2 with a uniquely identifiable identifier ("user identifier", such as UID001). In association with the user identifier, the parameters "game medium selected by lottery", "time elapsed since issuance", "remaining lottery time", "purchased game media", and "number of demo battles" are managed in table form. The parameters are not limited to those listed in FIG. 3. For example, information such as the level of the game media that the user possesses may be further included. Conversely, a portion of the parameters may be omitted. The user data 112 is managed mainly by the environment of use provision module 33.

While the "user identifier" is a combination of the letters "UID" and a three-digit number in this embodiment, this example is not limiting. For example, as long as the user can be uniquely identified, the user identifier may be a name freely set by the user.

The "game medium selected by lottery" is the name of a game medium representing the game medium that was issued to the user by the lottery module 31 by lottery. Instead of the name of a game medium, the game medium identifier in FIG. 2 may be used as the game medium selected by lottery.

The "time elapsed since issuance" is the length of time elapsed from when the current game medium was issued, i.e. from the immediately prior lottery held by the lottery module 31. The time elapsed since issuance is, for example, used by the environment of use provision module 33 to determine whether the time limit for purchasing the game medium selected by lottery has passed.

In this embodiment, the "remaining lottery time" indicates the remaining time in which the user can play a trial lottery. The trial lottery differs from a regular lottery in that before the user selects whether to possess a game medium, the user is provided with a game medium environment of use in which the game medium can be used. In this embodiment, the trial lottery is possible during a certain time period starting upon user registration (for example, eight days). After this time period has elapsed, only a regular lottery is possible. The remaining lottery time is, for example, used by the control processor 32 for terminal display to determine whether the user is not allowed to select the trial lottery on the below-described lottery top screen. Referring below simply to a lottery means that the lottery is a trial lottery.

The "purchased game media" refers to game media that the user has purchased, i.e. game media that the user has come to possess by performing operation input to select possession. Upon accepting operation input from the communication terminal 2 to select possession of the game medium selected by lottery, the environment of use provision module 33 stores the game medium selected by lottery in association with a user identifier. That is, the environment of use provision module 33 updates the user data 112 so as to add the game medium selected by lottery to the purchased game media. The "number of demo battles" indicates the number of demo battles the user has held using the game medium selected by lottery. Details on the demo battle are provided below.

In the example in FIG. 3, for the user whose user identifier is UID002, game medium B is selected by lottery, and 14 hours have elapsed since issuance. This user has 160 hours and 50 minutes left to play the trial lottery. This user has already purchased the game media "C" and "E" and has held a demo battle three times for the game medium B selected by lottery. On the other hand, the user whose user identifier is UID005 has just registered. This user has 190 hours and 10 minutes left to play the trial lottery. This user, however, has not yet requested that a lottery be held, and the other parameters are still blank.

(Screens Related to Lottery)

In relation to a lottery by the lottery module 31, the control processor 32 for terminal display causes the communication terminal 2 to display a lottery top screen, a lottery result screen, a purchase confirmation screen, and a demo battle screen. The following describes examples of these screens with reference to the drawings. The control processor 32 for terminal display may also cause the communication terminal 2 to display a screen announcing that the user has purchased the game medium selected by lottery (purchase notification) and a screen announcing that the game medium selected by lottery is being used during the trial period (trial use notification).

FIG. 4(a) illustrates an example of the lottery top screen displayed on the display 21 of the communication terminal 2. The display 21 of the communication terminal 2 is a touch panel and also functions as the operation interface 22. As illustrated in FIG. 4(a), the lottery top screen includes a title 24A in which "lottery top" is written in the upper center. The lottery top screen also includes a tab 24B for selecting the "regular lottery" and a tab 24C for selecting the "trial lottery". In this embodiment, the tab 24C is removed after elapse of a certain time period (for example, eight days) starting upon user registration, so that the trial lottery can no longer be selected.

In the example in FIG. 4(a), in conjunction with the selected tab 24C, an explanation 24D of the "trial lottery" is displayed, explaining that the trial lottery can be played up to three times a day, that the lottery time limit is DD/MM/YYYY, and other such information. The explanation 24D includes a precautions button 24E for displaying detailed precautions regarding the "trial lottery" and a lottery start button 24F for requesting that the "trial lottery" be held. Once the user presses the precautions button 24E, detailed precautions regarding the "trial lottery" are displayed. Once the user presses the lottery start button 24F, a request to hold the lottery is transmitted to the information processing device 1.

Figure 4B:
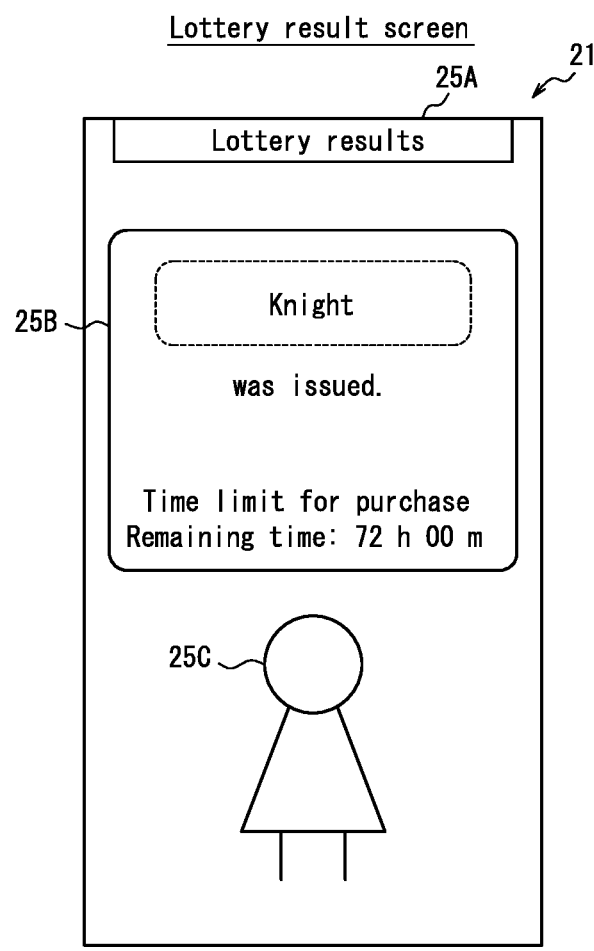
FIG. 4(b) illustrates an example of a lottery result screen.

FIG. 4(b) illustrates an example of a lottery result screen. As illustrated in FIG. 4(b), the lottery result screen includes a title 25A in which "lottery results" is written in the upper center. The lottery result screen also includes a lottery result explanation 25B explaining the lottery results. In the example in FIG. 4(b), the lottery result explanation 25B indicates that the game medium issued by the lottery, i.e. the game medium selected by lottery, is "Knight" and that 72 hours remain until the time limit for purchase. The lottery result screen also includes an image 25C of "Knight", i.e. the game medium selected by lottery.

Figure 5A:
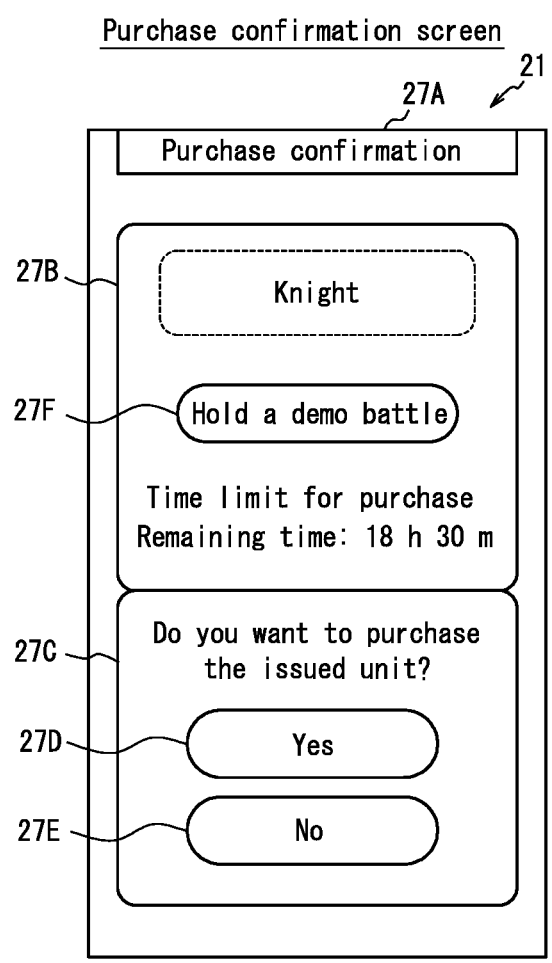
FIG. 5(a) illustrates an example of a purchase confirmation screen.

FIG. 5(a) illustrates an example of a purchase confirmation screen. As illustrated in FIG. 5(a), the purchase confirmation screen includes a title 27A in which "purchase confirmation" is written in the upper center. The purchase confirmation screen also includes a game medium explanation 27B and a purchase display 27C. The game medium explanation 27B explains that the game medium selected by lottery is "Knight" and other such information and includes a demo battle button 27F for requesting that a demo battle be held. Once the user presses the demo battle button 27F, a request to hold a demo battle is transmitted to the information processing device 1. The purchase display 27C includes a purchase button 27D for purchasing the issued unit, i.e. the game medium selected by lottery, and a cancel button 27E for canceling the purchase. The user can purchase the game medium selected by lottery by pressing the purchase button 27D. The user can also cancel purchase of the game medium selected by lottery by pressing the cancel button 27E.

In greater detail, when the purchase button 27D or the cancel button 27E is pressed, the environment of use provision module 33 updates the user data 112 as follows. First, when the purchase button 27D is pressed and possession is selected, the environment of use provision module 33 stores the game medium selected by lottery in association with the user identifier in the user data 112. On the other hand, when the cancel button 27E is pressed and purchase of the game medium selected by lottery is canceled, the environment of use provision module 33 does not associate the game medium selected by lottery with the user identifier in the user data 112.

In the example in FIG. 5(a), only the purchase button 27D and the cancel button 27E are provided, yet buttons corresponding to other user instructions may be further provided. For example, when a combine button is provided, the game medium selected by lottery may be combined with another game medium by pressing the combine button. The other game medium that is combined may, for example, be selectable from among the purchased game media. When combination of the game medium selected by lottery is selected, for example the environment of use provision module 33 first deletes data on the game medium that was associated with the user identifier in the user data 112 and was used for combination and then stores the game medium after combination in association with the user identifier in the user data 112. As another example, when an exchange button is provided, the game medium selected by lottery may be exchanged with another user by pressing the exchange button. When exchange of the game medium selected by lottery is selected, for example the environment of use provision module 33 stores the game media that are exchanged by exchanging the associations with the user identifiers in the user data 112. By providing the user with options other than possession, the usefulness of the game medium selected by lottery is further increased, thus leading to continued requests from the user to hold a lottery and further preventing a reduction in the user's motivation to continue the game.

Figure 5B:
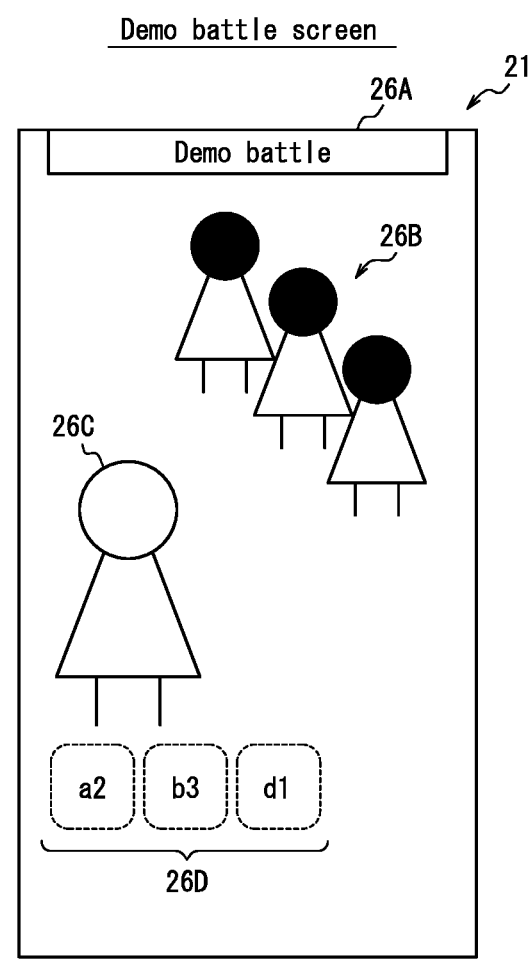
FIG. 5(b) illustrates an example of a demo battle screen.

FIG. 5(b) illustrates an example of a demo battle screen. As illustrated in FIG. 5(b), the demo battle screen includes a title 26A in which "demo battle" is written in the upper center. The demo battle screen also includes an image 26C of "Knight", i.e. the game medium selected by lottery, and an image 26B of the opponent. In this embodiment, an ability 26D of "Knight", i.e. the game medium selected by lottery, is also displayed on the demo battle screen.

(Processing by Information Processing Device)

Figure 6:
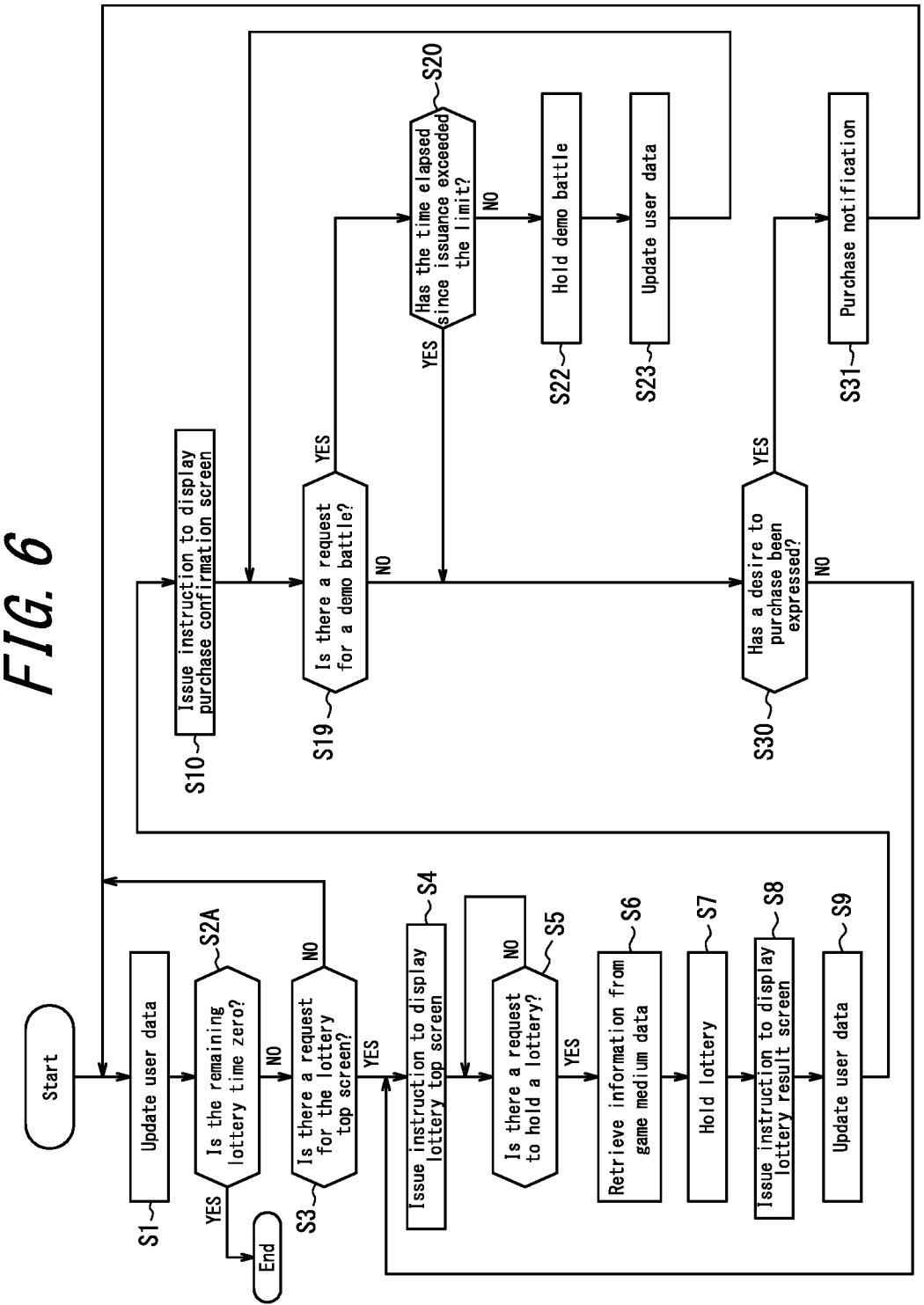
FIG. 6 is a flowchart illustrating a method of controlling the information processing device according to Embodiment 1.

FIG. 6 is a flowchart of processing when the information processing device 1 according to this embodiment holds the above-described trial lottery. In other words, the flowchart in FIG. 6 represents a method of controlling the information processing device 1.

In step S1, the information processing device 1 updates the user data 112. The information processing device 1 in particular updates the time elapsed since issuance and the remaining lottery time of the user data 112. If the processing is after the below-described purchase notification, the information processing device 1 also updates the purchased game media.

In step S2A, the information processing device 1 determines whether the remaining lottery time is zero. In other words, based on the remaining lottery time, the information processing device 1 determines whether the user can play the trial lottery. When the remaining lottery time has reached zero (step S2A: YES), the information processing device 1 terminates the processing in FIG. 6 so that the user cannot select the trial lottery on the lottery top screen. Conversely, when the remaining lottery time is not zero (step S2A: NO), the information processing device 1 proceeds to the processing in step S3.

In step S3, the information processing device 1 determines whether there is a request for the lottery top screen from the user, i.e. whether display of the lottery top screen has been requested. When the user has not requested the lottery top screen (step S3: NO), the information processing device 1 returns to the processing in step S1. Conversely, when the user has requested the lottery top screen (step S3: YES), the information processing device 1 proceeds to the processing in step S4.

In step S4, the information processing device 1 issues an instruction to display the lottery top screen, i.e. causes the lottery top screen (see FIG. 4(*a*)) to be displayed on the display 21 of the communication terminal 2.

In step S5, the information processing device 1 determines whether there is a request from the user to hold a lottery, i.e. whether the user has pressed the lottery start button 24F to request that a lottery be held. When there is no request from the user to hold a lottery (step S5: NO), the information processing device 1 waits. Conversely, when the user has requested that a lottery be held (step S5: YES), the information processing device 1 proceeds to the processing in step S6.

In step S6, the information processing device 1 accesses the game medium data 111 and retrieves necessary information. In particular, the information processing device 1 retrieves information on the rarity of the game media from the game medium data 111 and holds the lottery so that as the rarity of a game medium is higher, the probability of choosing that game medium decreases (for example, in inverse proportion). In addition to the probability of choosing the game medium being inversely proportional to rarity, the probability of choosing a particular game medium may be adjusted to be higher or lower. For example, when a particular boss campaign is being held, the probability of choosing a character (a type of game medium) that can inflict a large amount of damage on the boss may be increased. This adjustment of the probability of choosing a game medium can provide conditions advantageous for the user, which may further increase the user's motivation to continue the game.

In step S7, the information processing device 1 holds a lottery in accordance with probabilities that correspond to the rarity of game media. The game medium selected by lottery is thus determined.

While the lottery module 31 holds a lottery in accordance with probabilities that correspond to the rarity of game media in this embodiment, the order of issuance (selection) of game media may be set in advance, and when the user requests acquisition of a game medium, items may be issued in accordance with the set order, as described above. When the order of issuance of game media is set in advance, the information processing device 1 retrieves the issuance order of game media in step S6. In step S7, the information processing device 1 then determines the position in the issuance order of the game medium that was issued last and determines that the next game medium in the issuance order is the game medium selected by lottery.

In step S8, the information processing device 1 issues an instruction to display the lottery result screen, i.e. causes the lottery result screen (see FIG. 4(*b*)) to be displayed on the display 21 of the communication terminal 2.

In step S9, the information processing device 1 updates the user data 112. The information processing device 1 in particular updates the game medium selected by lottery and the time elapsed since issuance for the user who requested that the lottery be held.

In step S10, the information processing device 1 issues an instruction to display the purchase confirmation screen, i.e. causes the purchase confirmation screen (see FIG. 5(*a*)) to be displayed on the display 21 of the communication terminal 2.

In step S19, the information processing device 1 determines whether there is a request from the user to hold a demo battle, i.e. whether the user has pressed the demo battle button 27F to request that a demo battle be held. When the user has not requested a demo battle (step S19: NO), the information processing device 1 proceeds to the processing in step S30. Conversely, when the user has requested a demo battle (step S19: YES), the information processing device 1 proceeds to the processing in step S20.

In step S20, the information processing device 1 determines whether the time elapsed since issuance of the game medium has exceeded the limit. In other words, based on the time elapsed since issuance, the information processing device 1 determines whether the time limit for purchasing the game medium selected by lottery has been exceeded. When the time elapsed since issuance has not exceeded the limit, i.e. when the current time is still within the time in which the game medium selected by lottery is purchasable (step S20: NO), the information processing device 1 proceeds to the processing in step S22. Conversely, when the time elapsed since issuance has exceeded the limit, i.e. when the time limit for purchasing the game medium selected by lottery has passed (step S20: YES), the information processing device 1 proceeds to the processing in step S30. At this time, the information processing device 1 may reset (blank out) the following columns in the user data 112: game medium selected by lottery, time elapsed since issuance, and number of demo battles.

In this embodiment, no upper limit is placed on the number of demo battles. As another embodiment, however, an upper limit may be placed on the number of demo battles. In this case, in step S20, the information processing device 1 also determines whether the upper limit on the number of demo battles has been exceeded. In other words, when at least one of the time elapsed since issuance and the number of demo battles has exceeded the limit (step S20: YES), the information processing device 1 proceeds to the processing in step S30. Otherwise (step S20: NO), the information processing device 1 proceeds to the processing in step S22.

In step S22, the information processing device 1 holds a demo battle. At this time, the demo battle screen (see FIG. 5(*b*)) is displayed on the display 21 of the communication terminal 2. The demo battle is an event provided by the environment of use provision module 33 of the information processing device 1 and is a form of the game medium environment of use. The purpose of the demo battle is to allow the user to sufficiently understand the effect, function, and strength of the game medium selected by lottery before determining whether he or she desires to possess the game medium. Therefore, the environment of use provision module 33 of the information processing device 1 appropriately sets the opponent that the user battles and the conditions.

In the example in FIG. 5(b), the environment of use provision module 33 raises the level of "Knight", i.e. the game medium selected by lottery, to a level allowing for use of all of the abilities 26D (specifically, to level 3 or higher). So that the abilities of "Knight" can be used at this time, the level of the opponent is preferably set low. Doing so prevents the opponent from being too strong, so that "Knight" is not defeated before use of the abilities that "Knight" has. The environment of use provision module 33 may also have a tutorial mode to teach the user the timing that exploits the abilities 26D. At this time, the user can sufficiently understand the effect and strength of all of the abilities of "Knight". For an objective comparison of the effect, function, and strength of the game medium selected by lottery, the environment of use provision module 33 can also fix the level of the opponent. For the user to understand the abilities in particular, the environment of use provision module 33 may also appropriately change whether the battle is an individual battle or a group battle. For example, when the ability of the game medium selected by lottery is magic related to recovery, the effect cannot be understood without the presence of an ally. In such a case, the environment of use provision module 33 may set the conditions of the demo battle to allow for a group battle instead of an individual battle.

In step S23, the information processing device 1 updates the user data 112. In particular, the information processing device 1 updates the number of demo battles. Subsequently, the information processing device 1 returns to the processing in step S19. In other words, in this embodiment, the user can repeat the demo battle until becoming convinced of the effect, function, and strength of the game medium selected by lottery.

In step S30, the information processing device 1 determines whether the user has expressed an intention to purchase, i.e. whether the user has pressed the purchase button 27D or the cancel button 27E. When the user has pressed the cancel button 27E to cancel purchase of the game medium selected by lottery (step S30: NO), the information processing device 1 returns to the processing in step S4, and the user can once again request that a lottery be held. On the other hand, when the user has pressed the purchase button 27D to express an intention to purchase the game medium selected by lottery (step S30: YES), the information processing device 1 proceeds to the processing in step S31.

In step S31, the information processing device 1 transmits a purchase notification to the communication terminal 2 to indicate that the user now possesses the game medium selected by lottery. At this time, a message may be displayed on the display 21 of the communication terminal 2 to indicate that purchase is complete. Subsequently, the information processing device 1 returns to the processing in step S1.

As described above, the information processing device 1 of this embodiment provides the communication terminal 2 with a game medium environment of use (demo battle) that allows for use of the game medium selected by lottery before accepting operation input from the communication terminal 2 to select whether to possess the game medium. Therefore, user satisfaction with the acquired game medium can be increased, thereby suppressing a reduction in user satisfaction with the game due to possessing a game medium.

In this embodiment, the game medium environment of use that allows for use of the game medium selected by lottery is provided in the form of a demo battle, which is a different event than the game. At this time, the environment of use provision module 33 can set the opponent that the user battles in the demo battle and the conditions in accordance with the game medium selected by lottery. In other words, in this embodiment, the user can use the game medium selected by lottery in an environment that reliably allows the user to win the battle. Therefore, not only can the user understand the effects of the game medium selected by lottery, but by winning the battle, the user can also experience a further increase in motivation to continue the game. The purchase confirmation screen in this embodiment (see FIG. 5(a)) includes the demo battle button 27F, purchase button 27D, and cancel button 27E. In other words, in this embodiment, the user can select whether to hold a demo battle and whether to express a desire to possess the game medium selected by lottery. Therefore, the user has a degree of freedom with respect to the timing of possession.

In this embodiment, the user can repeat the demo battle until becoming convinced of the effect, function, and strength of the game medium selected by lottery. In other words, after holding a demo battle (see step S22 in FIG. 6), the user can again request that a demo battle be held (see step S19 of FIG. 6). Upon accepting operation input from the communication terminal 2 to hold the demo battle (upon the demo battle button 27F being pressed), the information processing device 1 can hold the demo battle again with the same conditions or after changing the conditions. Such repetition of the demo battle can further suppress a reduction in user satisfaction with the game due to possessing a game medium.

Embodiment 2

Figure 7:
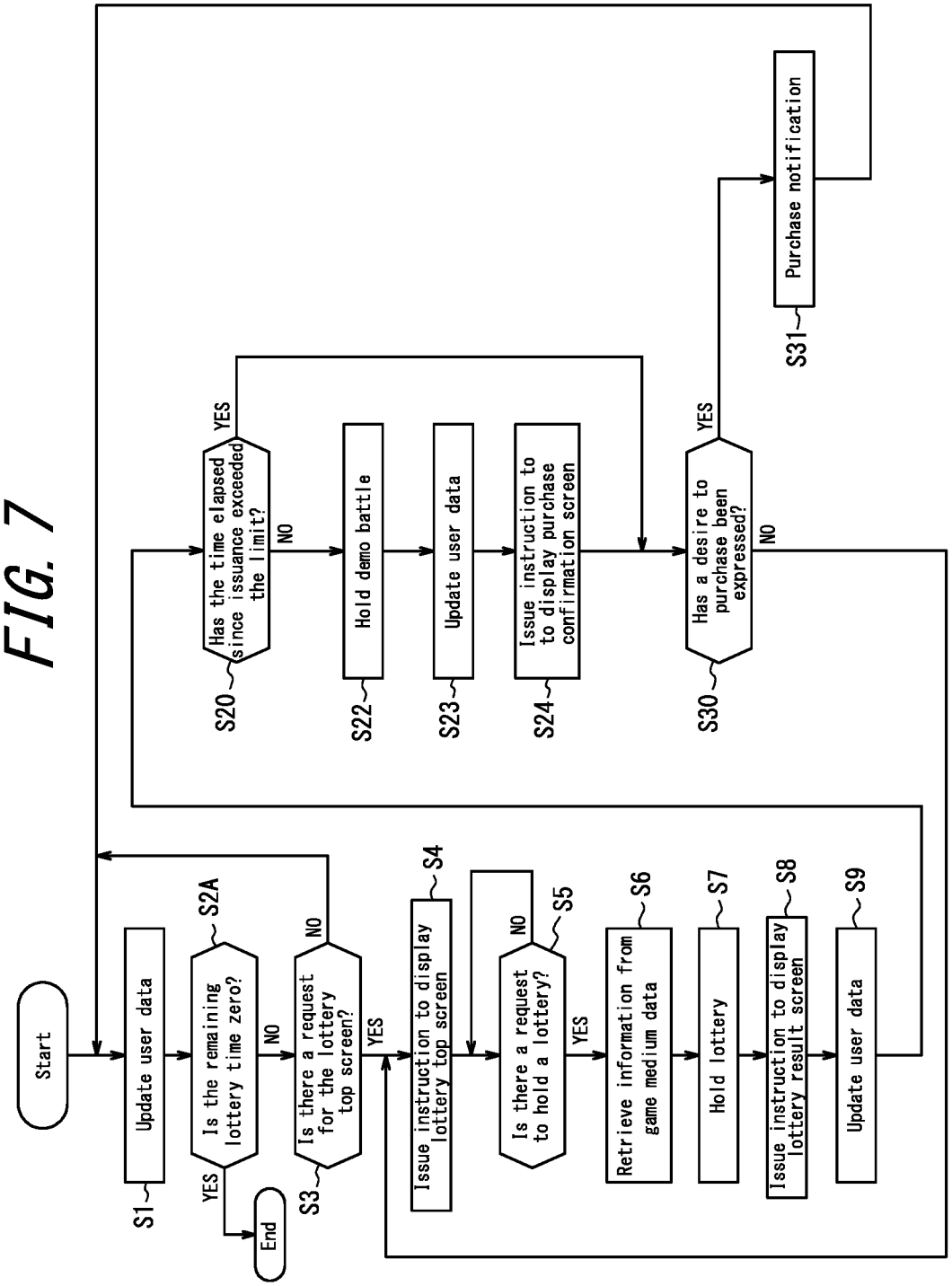
FIG. 7 is a flowchart illustrating a method of controlling an information processing device according to Embodiment 2.

FIG. 7 is a flowchart illustrating a method of controlling an information processing device 1 according to Embodiment 2. The structure of the information processing device 1 is the same as in Embodiment 1, and hence a description thereof is omitted. As compared to Embodiment 1, in which the number of demo battles was completely left up to user selection, the method of controlling the information processing device 1 according to this embodiment differs in that the demo battle is automatically held once without a selection operation by the user. The same reference signs are assigned to the same steps as in FIG. 6, and a description thereof is omitted. The portions that differ from Embodiment 1 are described below in detail.

First, since steps S1 to S9 are the same as steps bearing the same reference signs in the method of controlling the information processing device 1 according to Embodiment 1, a description thereof is omitted. After step S9, the processing in step S20 is performed. When the time elapsed since issuance has not exceeded the limit (step S20: NO), the information processing device 1 of this embodiment performs the processing in step S22.

Subsequently, in step S22, the information processing device 1 holds a demo battle. In other words, in this embodiment, the demo battle is held once after the lottery automatically, without requiring a user instruction to hold the demo battle.

In step S23, the information processing device 1 updates the user data 112. In particular, the information processing device 1 updates the number of demo battles. In this embodiment, since the demo battle is only held once, step S23 may be omitted.

In step S24, the information processing device 1 issues an instruction to display the purchase confirmation screen, i.e. causes the purchase confirmation screen to be displayed on the display 21 of the communication terminal 2. In this embodiment, the purchase confirmation screen is the screen in FIG. 5(a), omitting the demo battle button 27F. In other words, in this embodiment, after the demo battle is held once, it is confirmed whether the user desires to possess the game medium selected by lottery. When the time elapsed since issuance has exceeded the limit in step S20 (step S20: YES), the subsequent steps S30 and S31 are the same as Embodiment 1, and hence a description thereof is omitted.

Before accepting an indication from the user of whether he or she desires to possess the game medium, the information processing device 1 of this embodiment provides the user with a game medium environment of use (demo battle) that allows for use of the game medium selected by lottery. In this embodiment, unlike Embodiment 1, the demo battle is provided to the user automatically after the game medium lottery. Therefore, without operation input, the user always participates in the demo battle at least once, thereby reliably allowing the user to determine whether to purchase the game medium after understanding, with certainty, the effect, function, and strength of the game medium selected by lottery, without having to bother with operation input. A reduction in user satisfaction with the game due to possessing a game medium can thus be suppressed.

In this embodiment, a purchase confirmation screen in which the demo battle button 27F is omitted is displayed after the demo battle. In other words, the demo battle is only held once. The length of time that the main game is interrupted by another event (demo battle) is therefore shortened, allowing the game to proceed rapidly. As a modification to this embodiment, however, a purchase confirmation screen from which the demo battle button 27F is not omitted may be displayed, and the user may be allowed to repeat the demo battle multiple times. The user may be allowed to repeat the demo battle a limited number of times (for example, three times), and a purchase confirmation screen from which the demo battle button 27F is omitted may then be displayed. This approach allows for a good balance between rapid game progress and the user understanding the effect, function, and strength of the game medium selected by lottery.

Embodiment 3

FIG. 8 is a flowchart illustrating a method of controlling an information processing device 1 according to Embodiment 3. The structure of the information processing device 1 in this embodiment is the same as in Embodiments 1 and 2 (earlier embodiments), and hence a description thereof is omitted. As compared to the earlier embodiments, the method of controlling the information processing device 1 according to this embodiment differs in that the game medium selected by lottery can be tested in the main game (battle game), rather than in a demo battle. The same reference signs are assigned to the same steps as in FIGS. 6 and 7, and a description thereof is omitted. The portions that differ from the earlier embodiments are described below in detail.

In step S1, the information processing device 1 updates the user data 112. The information processing device 1 in particular updates the time elapsed since issuance and the remaining lottery time of the user data 112. If the processing is after the below-described purchase notification, the information processing device 1 also updates the purchased game media. In this embodiment, the demo battle is not held, and therefore the user data 112 do not include the number of demo battles. Since step S2A that follows step S1 is the same as the earlier embodiments, a description thereof is omitted.

In step S2B, the information processing device 1 refers to data on the time elapsed since issuance in the user data 112 to determine whether a predetermined time period has elapsed. The predetermined time period is a time period (trial period) in which the game medium selected by lottery can be tested in the game before purchase. The state in which the user is using the game medium selected by lottery in the game during the trial period before purchase is also expressed as "trial use". When the trial period has not elapsed (step S2B: NO), the information processing device 1 proceeds to the processing in step S3A. Conversely, when the trial period has elapsed (step S2B: YES), the information processing device 1 proceeds to the processing in step S24. When the user has not yet played the trial lottery, the trial period is considered not to have elapsed (step S2B: NO), and the information processing device 1 proceeds to the processing in step S3A. For example, if the trial period is three days, then before purchase, the user can understand the effects and the like of the game medium selected by lottery by simply playing the game as usual during those three days.

In step S3A, the information processing device 1 determines whether there is a request for the lottery top screen from the user, i.e. whether display of the lottery top screen has been requested. When the user is already participating in trial use of the game medium selected by lottery, or when the user has not requested the lottery top screen (step S3A: NO), the information processing device 1 returns to the processing in step S1. Conversely, when the user is not participating in trial use and has requested the lottery top screen (step S3A: YES), the information processing device 1 proceeds to the processing in step S4.

Since steps S4 to S9 are the same as steps bearing the same reference signs in the method of controlling the information processing device 1 according to the earlier embodiments, a description thereof is omitted. In step S11, which follows step S9, the information processing device 1 of this embodiment transmits a trial use notification to the communication terminal 2 to indicate the state in which the user is using the game medium selected by lottery in the game before purchase. At this time, a message may be displayed on the display 21 of the communication terminal 2 to indicate trial use. Subsequently, the information processing device 1 returns to the processing in step S1.

When the trial period has elapsed (step S2B: YES), then in step S24, the information processing device 1 issues an instruction to display the purchase confirmation screen, i.e. causes the purchase confirmation screen to be displayed on the display 21 of the communication terminal 2. In this embodiment, the purchase confirmation screen is the screen in FIG. 5(a), omitting the demo battle button 27F. The reason is that in this embodiment, the user uses the game medium selected by lottery in the main game during an established trial period, and no demo battle is held, thus making the demo battle button 27F unnecessary. After understanding the effects and the like of the game medium selected by lottery by using the game medium during the trial period, the user decides whether he or she desires to possess the game medium. Since steps S30 and S31 that follow step S24 are the same as the earlier embodiments, a description thereof is omitted.

In this embodiment, when the cancel button 27E is pressed, the environment of use provision module 33 updates the user data 112 as follows. Once the trial period starts, the environment of use provision module 33 stores the game medium selected by lottery in association with a user identifier in the user data 112. Upon the cancel button 27E being pressed, the environment of use provision module 33 deletes data on the game medium selected by lottery that was associated with a user identifier in the user data 112.

Before accepting an indication of whether the user desires to possess the game medium, the information processing device 1 of this embodiment provides the user with a game medium environment of use (main game with an established trial period) that allows for use of the game medium selected by lottery. Therefore, the user can determine whether to purchase the game medium selected by lottery after understanding the actual effect, function, and strength of the game medium in the main game, thereby preventing a reduction in user satisfaction with the game due to possessing a game medium.

The information processing device 1 of this embodiment displays the purchase confirmation screen after the trial period elapses. The purchase confirmation screen may, however, be displayed at shorter intervals (for example, every eight hours). When the user expresses a desire to purchase the game medium selected by lottery during the predetermined time period (trial period), the information processing device 1 may add a different attribute to the game medium in accordance with the speed with which the user expressed the desire to purchase. For example, when the user purchases at an earlier time, the game medium may be provided with a higher level than when the user purchases later. The information processing device 1 may, for example, provide a level bonus that increases the level by +2 when the user purchases the game medium the first time the purchase confirmation screen is displayed and that increases the level by +1 when the user purchases the game medium the second time the purchase confirmation screen is displayed. The information processing device 1 may also provide a special ability in addition to the regular abilities if the user purchases the game medium the first time the purchase confirmation screen is displayed. Providing the game medium with a different attribute in accordance with the speed with which the user indicates a desire to purchase can increase the user's motivation to purchase and further increase the user's motivation to continue the game.

Although the disclosed embodiments have been described based on drawings and examples, it is to be noted that various changes and modifications will be apparent to those skilled in the art based on this disclosure. Therefore, such changes and modifications are to be understood as included within the scope of this disclosure. For example, the functions and the like included in the various blocks, steps, and the like may be reordered in any logically consistent way. Furthermore, blocks and steps may be combined into one or divided.

For example, when the information processing device 1 functions as a game server to which the communication terminal 2 is connected over a network, a mix of web display and native display may be used. For example, game progress screens may be displayed by web display on the communication terminal 2 based on data generated by the server (information processing device 1), and other menu screens and the like may be displayed by native display with a native application installed on the communication terminal 2. In other words, the information processing device 1 may be a server for a hybrid game in which the server (information processing device 1) and the player terminal (communication terminal 2) are each responsible for a portion of the processing of the hybrid game.

The invention claimed is:

1. A method of controlling an information processing device for providing a game to a communication terminal, the method comprising:
   determining at least one game medium from among a plurality of game media to be provided to a user of the communication terminal;
   causing the communication terminal to display a screen including the determined at least one game medium, a first button, a second button, and a third button, after determining the at least one game medium and before providing the determined at least one game medium to the user of the communication terminal; and
   storing the determined at least one game medium associated with a user identifier of the user of the communication terminal in response to receiving a selection of the first button, not associating the at least one game medium with the user identifier of the user of the communication terminal in response to receiving a selection of the second button, and providing the communication terminal with a game medium environment of use for the user to test use of the determined at least one game medium in response to receiving a selection of the third button.

2. The method according to claim 1, wherein
   when a time elapsed since determining the at least one game medium exceeds a predetermined limit, not providing the communication terminal with the game medium environment of use in response to receiving the selection of the third button.

3. The method according to claim 1, wherein
   the screen includes information on whether a time elapsed since determining the at least one game medium exceeds a predetermined limit.

4. The method according to claim 1, wherein
   the user determines whether the communication terminal is to be provided with the game medium environment of use, and
   the user determines a number of times that the communication terminal is to be provided with the game medium environment of use.

5. The method according to claim 1, further comprising:
   causing the communication terminal to redisplay the screen, after providing the communication terminal with the game medium environment.

6. The method according to claim 1, wherein
   a number of times that the communication terminal is to be provided with the game medium environment of use is set in advance.

7. An information processing device for providing a game to a communication terminal, the information processing device comprising:
   circuitry configured to
      determine at least one game medium from among a plurality of game media to be provided to a user of the communication terminal,
      cause the communication terminal to display a screen including the determined at least one game medium, a first button, a second button, and a third button, after determining the at least one game medium and before providing the determined at least one game medium to the user of the communication terminal,
      store the determined at least one game medium associated with a user identifier of the user of the communication terminal in response to receiving a selection of the first button, and provide the communication terminal with a game medium environment of use for the user to test use of the determined at least one game medium in response to receiving a selection of the third button, wherein the circuitry is configured not to associate the at least one game medium with the user identifier of the user of the communication terminal in response to receiving a selection of the second button.

8. The information processing device according to claim 7, wherein when a time elapsed since determining the at least one game medium exceeds a predetermined limit, the circuitry is configured not to provide the communication terminal with the game medium environment of use in response to receiving the selection of the third button.

9. The information processing device according to claim 7, wherein the screen includes information on whether a time elapsed since determining the at least one game medium exceeds a predetermined limit.

10. The information processing device according to claim 7, wherein the user determines whether the communication terminal is to be provided with the game medium environment of use, and the user determines a number of times that the communication terminal is to be provided with the game medium environment of use.

11. The information processing device according to claim 7, wherein the circuitry is configured to cause the communication terminal to redisplay the screen, after providing the communication terminal with the game medium environment.

12. The information processing device according to claim 7, wherein a number of times that the communication terminal is to be provided with the game medium environment of use is set in advance.

13. One or more non-transitory computer-readable recording media including computer program instructions, which when executed by an information processing device for providing a game to a communication terminal, cause the information processing device to:

determine at least one game medium from among a plurality of game media to be provided to a user of the communication terminal;

cause the communication terminal to display a screen including the determined at least one game medium, a first button, a second button, and a third button, after determining the at least one game medium and before providing the determined at least one game medium to the user of the communication terminal;

store the determined at least one game medium associated with user identifier of the user of the communication terminal in response to receiving a selection of the first button; and provide the communication terminal with a game medium environment of use for the user to test use of the determined at least one game medium in response to receiving a selection of the third button, wherein the computer program instructions further cause the information processing device not to associate the at least one game medium with the user identifier of the user of the communication terminal in response to receiving a selection of the second button.

14. The one or more non-transitory computer-readable recording media of claim 13, wherein when a time elapsed since determining the at least one game medium exceeds a predetermined limit, the computer program instructions further cause the information processing device not to provide the communication terminal with the game medium environment of use in response to receiving the selection of the third button.

15. The one or more non-transitory computer-readable recording media of claim 13, wherein the screen includes information on whether a time elapsed since determining the at least one game medium exceeds a predetermined limit.

16. The one or more non-transitory computer-readable recording media of claim 13, wherein the user determines whether the communication terminal is to be provided with the game medium environment of use, and the user determines a number of times that the communication terminal is to be provided with the game medium environment of use.

17. The one or more non-transitory computer-readable recording media of claim 13, wherein the computer program instructions further cause the information processing device to cause the communication terminal to redisplay the screen, after providing the communication terminal with the game medium environment.

18. The one or more non-transitory computer-readable recording media of claim 13, wherein a number of times that the communication terminal is to be provided with the game medium environment of use is set in advance.

* * * * *